March 31, 1953 J. E. KISSNER ET AL 2,633,164
TREE AND BRUSH CUTTING ATTACHMENT FOR BULLDOZERS
Filed July 11, 1951 2 SHEETS—SHEET 1
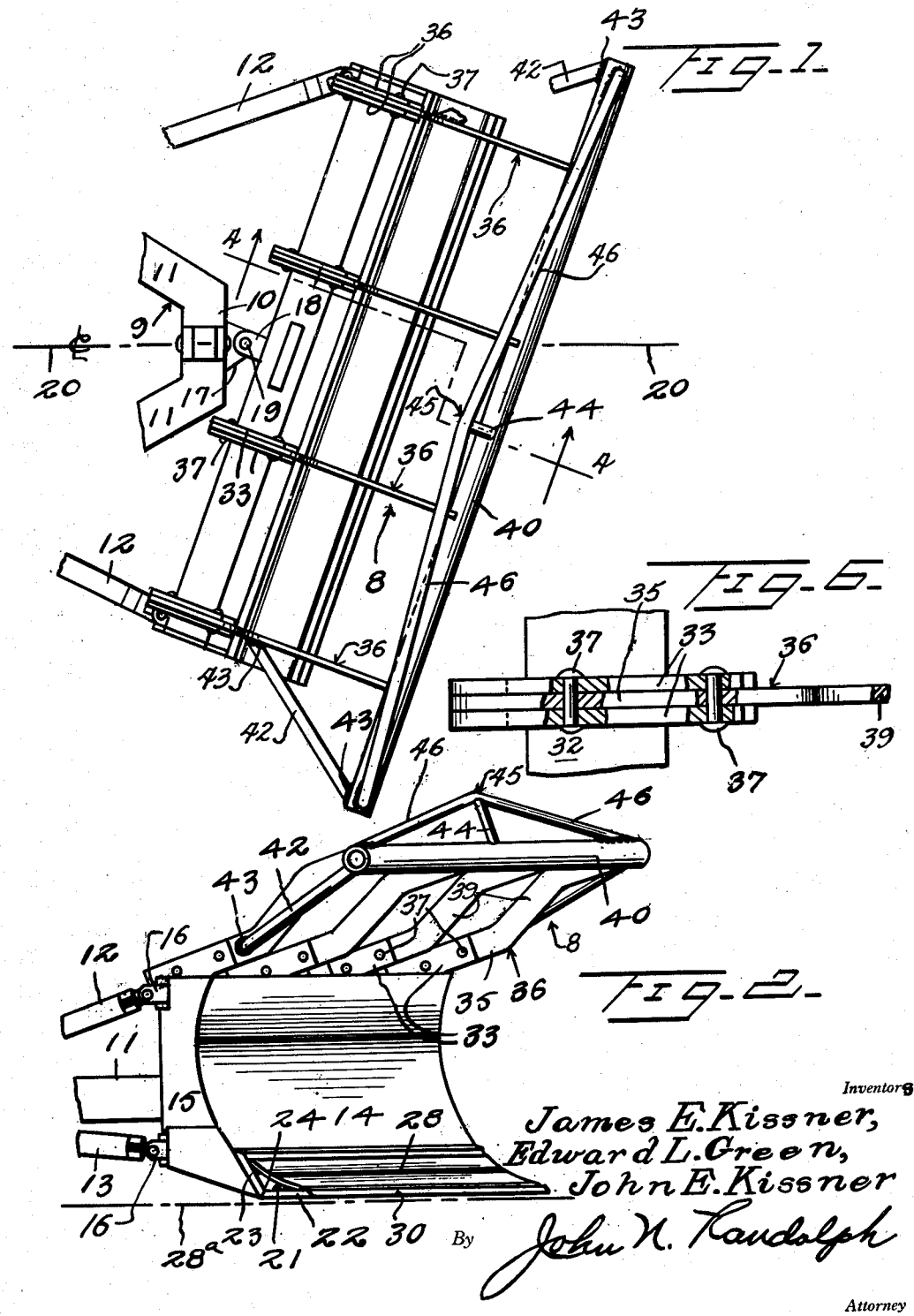
Inventors
James E. Kissner,
Edward L. Green,
John E. Kissner
By John N. Randolph
Attorney

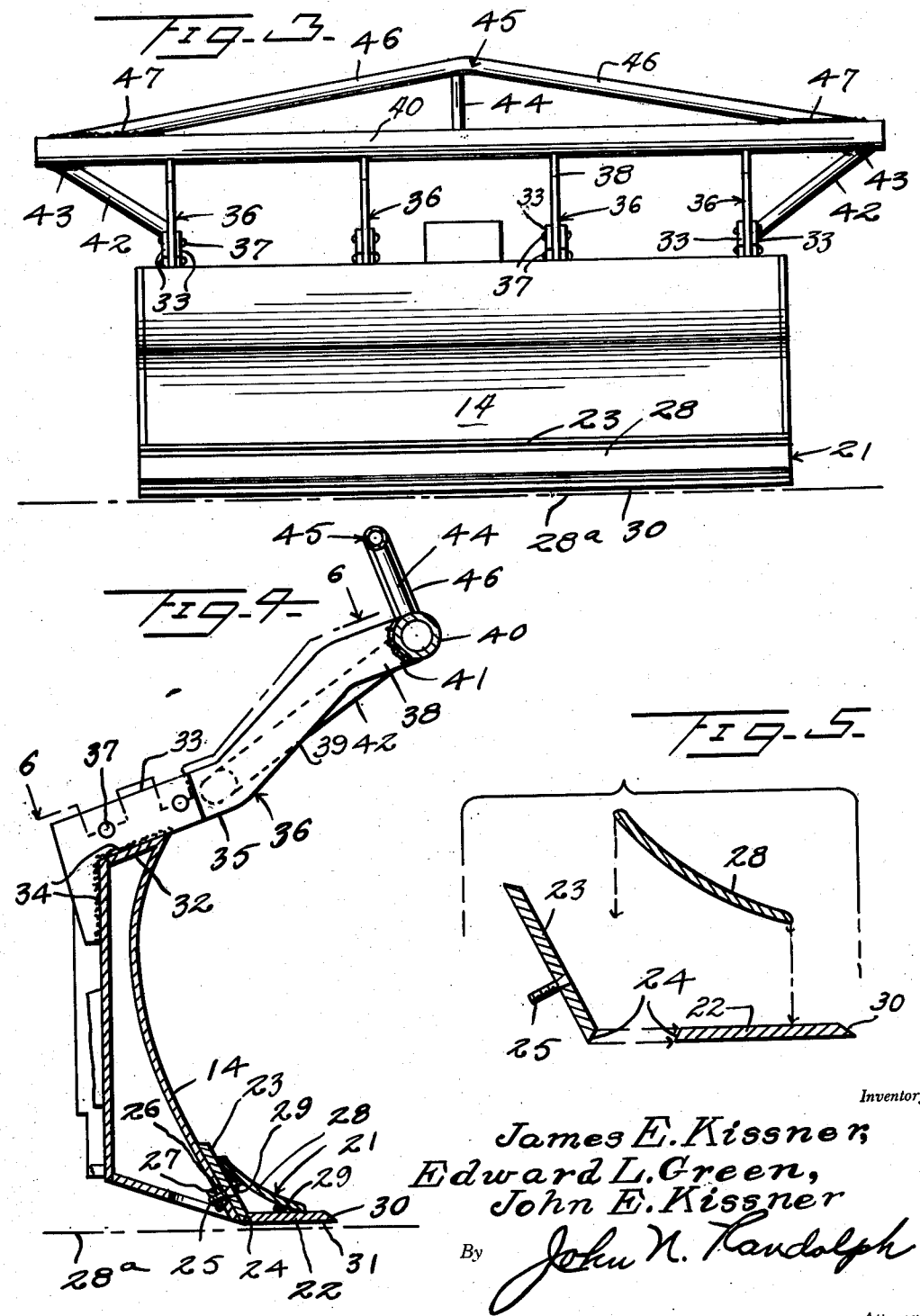

Patented Mar. 31, 1953

2,633,164

UNITED STATES PATENT OFFICE 2,633,164

TREE AND BRUSH CUTTING ATTACHMENT FOR BULLDOZERS

James E. Kissner, Edward L. Green, and John E. Kissner, Lottie, La.

Application July 11, 1951, Serial No. 236,154

3 Claims. (Cl. 144—34)

This invention relates to a novel attachment for use with an angle bulldozer blade supported by a large tractor or prime mover for cutting brush and trees of a diameter of fifteen inches or less and more particularly has reference to a cutting attachment which will cut off trees and brush at the ground level thereby leaving no stump holes.

Another object of the invention is to provide a bulldozer cutting attachment which will pile trees cut thereby to one side of the apparatus in a windrow and in a previously cleared area enabling the machine to continue on in substantially a straight path cutting and depositing trees and brush in a windrow and without the necessity of turning and backing the machine for moving trees and brush previously cut to one side of the machine.

Another object of the invention is to provide a cutting attachment which by cutting off trees at ground level will eliminate the large mounds of earth which would otherwise be rooted up with the roots of a tree, thereby making it possible to burn the trees sooner and easier since no dirt is mixed therewith.

A further object of the invention is to provide a cutter which eliminates large holes left in the ground where trees are uprooted and which is very undesirable in many sections of the country and which will additionally leave the stump portion at ground level in a laminated or partially broken condition so that rain water may readily enter therein to cause a quick rotting of the stump and tree roots.

Still a further and particularly important object of the invention is to provide a cutting blade which will function in combination with a pushing or bending unit for executing a slicing cut and for deflecting the cut tree or brush laterally away from the machine.

Another object of the invention is to provide an attachment including a wedge-shaped cutting blade having relatively smooth top and bottom surfaces to enable the blade to slide along a tree trunk and thereby execute a slicing cut and wherein the blade will additionally tend to pry the trunk apart as it cuts.

Various other objects and advantages of the invention will hereinafter become more fully apparent from the following description of the drawings, illustrating a presently preferred embodiment thereof, and wherein:

Figure 1 is a top plan view showing the cutting attachment applied to a conventional angle bulldozer blade;

Figure 2 is a side elevational view thereof;

Figure 3 is a front elevational view thereof;

Figure 4 is an enlarged cross sectional view taken substantially along a plane as indicated by the line 4—4 of Figure 1;

Figure 5 is an exploded cross sectional view showing the parts of the tree and brush cutter disconnected, and Figure 6 (sheet 1) is a fragmentary horizontal sectional view partly in top plan taken substantially along a plane as indicated by the line 6—6 of Figure 4.

Referring more specifically to the drawings, for the purpose of illustrating a preferred application and use of the tree and brush cutting attachment, designated generally 8 and comprising the invention, the forward end of a bulldozer frame is illustrated in Figure 1 and designated generally 9 and includes a front portion 10 having rearwardly diverging corresponding arms 11, portions only of which are shown. The frame 9 constitutes a conventional bulldozer part and the rearwardly extending arms 11 thereof have parallel rear end portions, not shown, which are pivotally mounted on the sides of a large prime mover such as a large caterpillar tractor, not shown, so that the frame 9 is capable of vertical swinging movement. The bulldozer frame also includes a pair of upper rearwardly converging braces 12 which are normally inclined downwardly and rearwardly and a pair of lower rearwardly converging braces 13 which are ordinarily inclined rearwardly and upwardly. The braces 12 and 13 located at each side of the frame 9 have their rear ends, not shown, pivotally supported on the adjacent frame arm 11 and said braces 12 and 13, which are likewise conventional, are formed of telescopic sections which may be extended and retracted pneumatically or hydraulically. A bulldozer blade or plate 14 is provided at its ends with rearwardly turned flanges 15, each of which is provided with a pair of swingably supported rearwardly extending apertured ears 16 adjacent the upper and lower ends of said flange 15. The ears 16 are pivotally connected to the forward ends of the braces 12 and 13 about horizontally disposed pivots whereas the ears 16 are swingably connected to the flanges 15 for swinging movement about vertical pivots. The frame portion 10 intermediate of its ends is provided with a forwardly projecting ear or plate 17 which is received between a pair of vertically spaced apertured ears 18 which project from the rear surface of the blade 14, intermediate of its ends. The plates 17 and 18 are connected by a vertically disposed pivot pin 19 whereby the blade 14 is permitted to swing in a horizontal plane relatively to the frame 9 when complementary braces 12 and 13 are extended and the other pair of braces 12 and 13 are retracted and the entire blade 14, frame 9 and braces 12 and 13 may be raised and lowered by a suitable hoist, not shown, by means of which the forward end of the frame 9 may be swung upwardly or permitted to swing downwardly. As previously stated, the frame portion 10 is disposed transversely of the longitudinal axis of the tractor or prime mover, not shown, on which the bulldozer is supported and which longitudinal axis is represented by the center line 20 as seen in Figure 1. The bulldozer blade or plate 14 is shown in a normal position in Figure 1 and it will be noted that the axis of said blade 14 is disposed at an oblique angle to the center line 20 so that its left-hand end, as viewed from rear to front of the bulldozer frame 9 or from left to right of Figure 1, is disposed considerably in advance of the right-hand end of said blade 14. The parts 9 to 20, inclusive, constitute no part of the present invention but have merely been illustrated and briefly described to afford a better understanding of the tree and brush cutting attachment, designated generally 8.

Said attachment 8 includes a cutting unit, designated generally 21 and which is adapted to be mounted on the forward side and the lower edge of the bulldozer plate 14 and in lieu of a conventional removable bulldozer blade, not shown. The tree and brush cutting unit 21 includes two cutting blades 22 and 23 which may be conventional bulldozer blades and which are provided with bevelled back edges which are disposed in abutting engagement and welded together as indicated at 24 in Figures 2 and 4 so that the planes of the blades 22 and 23 are disposed at obtuse angles to one another, as best seen in Figures 4 and 5. The blade 23, which is adapted to be disposed flush against the forward side of the plate 14 and adjacent its bottom edge, is provided at a plurality of longitudinally spaced points with threaded studs 25 which are fixed thereto and which project from the outer side thereof through openings 26 provided in the plate 14 near its lower edge. A nut 27 engages each stud 25 and is tightened to bear against the rear surface of the plate 14 for securing the cutting unit 21 to the plate 14 and so that the lower blade 22 will project forwardly from the bottom edge of the plate 14 and will be disposed in substantially a horizontal plane when the bottom edge of the plate 14 is disposed adjacent the ground level, as indicated at 28a in Figures 2, 3 and 4. A reinforcing plate 28 is arced or bowed transversely from end-to-end thereof and is disposed between the inner sides of the blades 22 and 23 with its concave side facing upwardly and forwardly and is welded to said blades 22 and 23, as indicated at 29. The lower forward edge of the reinforcing blade 28 is spaced from the forward edge of the blade 22, which forward edge is bevelled on its upper side to form a cutting edge 30. The underside of the blade 22 is provided with a coating of extremely hard material as indicated at 31 or said bottom surface may be suitably treated to produce a hardening thereof to withstand wear and to resist dulling of the cutting edge 30. It will be noted that the blade 22 combines with the reinforcing plate 28 to form a wedge-shaped cutter, for a purpose which will hereinafter become apparent.

The bulldozer plate 14 has an upper downwardly and rearwardly inclined top surface 32 to which is secured a plurality of supporting bars 33, as by welding, as seen at 34 in Figure 4. The bars 33 are disposed on edge relatively to the top surface 32 and are positioned transversely thereof to receive an end 35 of a supporting arm 36 between each pair of adjacently disposed bars 33, as indicated in Figure 1. The arm ends 35 are secured to the bars 33 by suitable fastenings 37. The arms 36 extend forwardly from the bars 33 above the plate 14 and each arm 36 has an upwardly and forwardly inclined forward end 38 which is upwardly offset relatively to its end 35. The ends 35 and 38 of the arms 36 are connected by an upwardly and forwardly inclined intermediate portion 39. A rigid pusher element 40, preferably in the form of a pipe, extends across the forward terminals of the arm ends 38 and is secured to each of said ends 38 as by welding, as seen at 41.

The two arms 36 which are located adjacent each end of the bulldozer plate 14 likewise support diagonal braces 42, one of which is mounted on each of said arms 36 with an end thereof secured to its portion 35, forwardly of the bars 33. Said braces 42 are secured in any suitable manner, as by welding as seen at 43 to the outer sides of said arms 36 and to the terminals of the pushing element 40, said braces 42 extending in diverging relationship forwardly from the arms 36 to which they are secured.

A supporting post 44 is secured to and rises from the pusher element 40, intermediate of the ends of the latter, and is secured at its upper end to the intermediate portion of an elongated brace 45 which is likewise preferably formed of a length of pipe of smaller diameter than the pipe 40 and which has corresponding end portions 46 which are inclined downwardly and outwardly and which merge at their terminals with the terminals of the pusher element 40 and are secured thereto in any suitable manner as by welding, as seen at 47.

The normal operating position of the attachment 8 is as shown in Figures 2, 3 and 4 with the blade 22 disposed parallel to and slightly above the ground level as indicated at 28a and it will be noted that the pusher element 40 is disposed forwardly of the cutting edge 30, as best seen in Figure 4. The direction of travel of the cutter 8 is from left to right of Figures 1, 2 and 4 in a direction as indicated by the center line 20. As the cutter 8 is advanced the cutting edge 30 will cut off brush in its path of travel at approximately the ground level and will also sever trees up to a diameter of fifteen inches at approximately the ground level. The trunks of the trees will be initially engaged by the pusher element 40 and pushed over in a direction away from the cutting edge 30 so that the cutting edge can more readily sever the trunk adjacent the ground and it will be readily apparent that when the pushing element 40 and cutting edge 30 strike the trunk of a tree of a relatively large diameter approaching that of fifteen inches, that the resistance to the pushing of the trunk and the cutting thereof will cause the prime mover, not shown, by which the attachment 8 is propelled, to slip or be displaced to the right as seen in Figure 3 so that the cutting edge 30 will accomplish a slicing cut to thereby more readily sever the tree trunk. As the trunk is severed adjacent the ground, the tree, not shown, will be thrown to the left of Figure 3 by the oblique disposition of the pusher element 40 relatively to the direction of travel of the attachment 8, so that the tree will be deposited to the left of the pusher element 40 as seen in Figure 3 and brush will similarly be deposited to the left of the attachment 8 in a windrow to one side of the apparatus, so that the apparatus or machine may continue on in a straight path cutting brush and small trees in its path of movement and throwing them to the right of the machine, as viewed from the rear end thereof forwardly, into a previously cleared area. The pusher element 40 will thus throw the tree away from the apparatus as the trunk is cut off but should the tree trunk come to rest against one of the brace ends 46 it will be caused to slide outwardly and downwardly off of the left-hand end of the brace 45, as seen in Figure 3. The blade 22 and reinforcing plate 28 provide a wedge-shaped portion which will most effectively wedge open the kerf cut in a tree trunk by the cutting edge 30 and will likewise tend to cause the tree or brush to fall away from the attachment 8 and in addition will tend to break up the trunk at the surface of the cut to admit moisture thereto to speed up the rotting of the trunk. Thus tree trunks will be cut off at ground level rather than being grubbed from the ground thereby leaving no holes in the ground and additionally leaving the trunk without a ball of earth surrounding the roots, so that the trees will more quickly dry out and may be burned and thus completely consumed and which would be impossible if each tree was left with a ball of earth clinging to the roots thereof.

The blade 22 may also be disposed in an elevated position by raising the frame 9 and bulldozer plate 14 and by adjustment of the braces 12 and 13, the blade 22 may be maintained in substantially a horizontal position when elevated. With the cutting attachment 8 in an elevated position, not shown, larger trees may be cut off initially about three feet above the ground and thereafter re-cut at ground level. When it is not desired to use the attachment 8, the blade unit 21 may be removed by detaching the nuts 27 and a conventional bulldozer blade mounted on the plate 14 so that the apparatus may then be used as a conventional bulldozer. It will also be noted that the blade unit 21 provides a substantially smooth surface, both at its top and bottom sides from end-to-end thereof thus enabling the parts 22 and 28 to slide along a tree trunk through a kerf cut therein for accomplishing the slicing cut, previously described.

Various modifications and changes are contemplated and may obviously be resorted to, without departing from the spirit or scope of the invention as hereinafter defined by the appended claims.

We claim as our invention:

1. The combination with a tractor supported vertically swingable bulldozer including an elongated bulldozer plate defining the forward end of the bulldozer, said plate being straight from end-to-end thereof and disposed at an oblique angle to the longitudinal axis of the bulldozer and to its direction of travel and which plate is provided with an upper edge and a lower edge each extending from end-to-end thereof and each disposed in substantially a horizontal plane; of a brush and tree cutting attachment forming a replacement for a replaceable bulldozer blade comprising a cutting blade unit detachably secured to the outer, front side of the bulldozer plate including a mounting plate detachably secured to and disposed against said bulldozer plate and a blade extending from end-to-end of the bulldozer plate and extending forwardly from the bottom edge thereof and disposed in a plane parallel to said bottom edge, said blade having a rear edge secured to the mounting plate and a forward cutting edge disposed forwardly of and substantially parallel to the vertical plane of said bottom edge of the bulldozer plate for cutting brush and trees adjacent the ground level by a slicing action as the bulldozer is propelled forwardly.

2. A bulldozer brush and tree cutting attachment as in claim 1, the plane of the mounting plate being disposed at an obtuse angle to the plane of the blade, said cutting blade unit including a reinforcing plate disposed between the adjacent sides of the blade and mounting plate and extending longitudinally thereof, said reinforcing plate having one longitudinal edge secured to the blade and the other longitudinal edge secured to the mounting plate and being transversely bowed from end-to-end thereof and having an upper, concave side disposed remote to the blade and mounting plate and defining a smooth uninterrupted surface between the upper surface of the forward edge portion of the blade and the upper edge portion of the mounting plate and which surface extends from end-to-end of the blade, the edge of said reinforcing plate, secured to the blade, being disposed substantially parallel to the cutting edge of the blade and spaced rearwardly therefrom.

3. A brush and tree cutting attachment for bulldozers as in claim 1, and a pushing unit secured to said bulldozer plate and projecting forwardly from the upper edge thereof and including an elongated pusher element disposed above and forwardly of the upper edge of the bulldozer plate and substantially parallel thereto and extending beyond the ends thereof, said pusher element being disposed forwardly of the cutting edge of the blade and in a vertical plane substantially parallel to the vertical plane of the cutting edge for engaging brush and trees and for bending the brush and trees away from said cutting edge of the blade and laterally away from the cutting attachment.

JAMES E. KISSNER.
EDWARD L. GREEN.
JOHN E. KISSNER.

REFERENCES CITED

The following references are of record in the file of this patent:

UNITED STATES PATENTS

| Number | Name | Date |
| --- | --- | --- |
| 2,160,702 | Le Bleu | May 30, 1939 |
| 2,169,606 | Hutchins et al. | Aug. 15, 1939 |
| 2,295,458 | Edwards | Sept. 8, 1942 |
| 2,309,223 | Staring | Jan. 26, 1943 |
| 2,336,124 | Phoenix | Dec. 7, 1943 |
| 2,411,623 | Jaques | Nov. 26, 1946 |